(12) United States Patent
Piirainen et al.

(10) Patent No.: US 11,303,333 B2
(45) Date of Patent: Apr. 12, 2022

(54) METHOD AND AN APPARATUS FOR A TRANSMISSION SCHEME

(71) Applicant: NOKIA TECHNOLOGIES OY, Espoo (FI)

(72) Inventors: Olli Piirainen, Oulu (FI); Jari Ylioinas, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/378,285

(22) Filed: Jul. 16, 2021

(65) Prior Publication Data
US 2022/0021426 A1   Jan. 20, 2022

(30) Foreign Application Priority Data
Jul. 17, 2020   (FI) .................................... 20205760

(51) Int. Cl.
*H04B 7/0456* (2017.01)
*H04B 7/024* (2017.01)
*H04W 52/24* (2009.01)

(52) U.S. Cl.
CPC ........... *H04B 7/0465* (2013.01); *H04B 7/024* (2013.01); *H04B 7/0486* (2013.01); *H04W 52/241* (2013.01)

(58) Field of Classification Search
CPC ... H04L 1/0026; H04B 7/0639; H04B 7/0626; H04B 7/0456; H04B 7/024; H04B 7/0486; H04W 52/241
See application file for complete search history.

(56) References Cited

U.S. PATENT DOCUMENTS

| 2010/0166100 A1 | 7/2010 | Medvedev et al. |
| 2011/0115675 A1* | 5/2011 | Sanayei ............... H04B 7/0617 342/373 |

(Continued)

FOREIGN PATENT DOCUMENTS

EP   3364554 A1   8/2018

OTHER PUBLICATIONS

Communication of Acceptance under section 29a of Patents Decree dated Nov. 25, 2020 corresponding to Finnish Patent Application No. 20205760.

(Continued)

*Primary Examiner* — Sung S Ahn
(74) *Attorney, Agent, or Firm* — Squire Patton Boggs (US) LLP

(57) ABSTRACT

According to an aspect, there is provided an apparatus for performing beamforming optimization for a MIMO architecture. The apparatus maintains, in a database, channel state information of a plurality of radio channels comprising first and second order statistics. The apparatus calculates, separately for each of two or more remote radio units using an eigenbeamforming scheme, first sets of beamforming weights based on the second order statistics. Then, the apparatus performs, for each terminal device, single-user MIMO optimization between the two or more remote radio units to maximize a pre-defined metric, being a mutual information metric or signal-to-interference-plus-noise, based on first sets of beamforming weights and the first order statistics. The result, for each terminal device, is a second set of beamforming weights. The apparatus causes transmitting data using beams formed by applying both first and second sets of optimized beamforming weights at the two or more remote radio units.

15 Claims, 7 Drawing Sheets

(56) References Cited

U.S. PATENT DOCUMENTS

| | | | |
|---|---|---|---|
| 2011/0205930 A1* | 8/2011 | Rahman | H04B 7/0417 |
| | | | 370/252 |
| 2014/0036815 A1 | 2/2014 | Lei et al. | |
| 2021/0234580 A1* | 7/2021 | El-Keyi | H04B 7/0452 |

OTHER PUBLICATIONS

Finnish Search Report dated Nov. 25, 2020 corresponding to Finnish Patent Application No. 20205760.

M. Sadeghzadeh et al., "Clustered Linear Precoding for Downlink Network MIMO Systems with Partial CSI," 2013 International Conference on Computing, Networking and Communications, Signal Processing for Communications Symposium, IEEE, Jan. 28-31, 2013.

V. Sharma et al., "Robust Downlink Beamforming Using Positive Semi-Definite Covariance Constraints," In: 2008 International ITG Workshop on Smart Antennas, IEEE Feb. 26-27, 2008, pp. 36-41.

Extended European Search Report dated Dec. 17, 2021 corresponding to European Patent Application No. 21186090.3.

Ronghong Mo et al., "Distributed precoding design for MIMO interference channels," Information Theory and its Applications (ISITA), 2010 International Symposium, IEEE, Oct. 17, 2010, pp. 885-889, XP031811279.

Shirish Nagaraj et al., "Coordinated beamforming in clustered HetNets: System design and performance evaluation," 2014 IEEE Wireless Communications and Networking Conference Workshops (WCNCW), IEEE, Apr. 6, 2014, pp. 70-75, XP032668366.

Jianfeng Shi et al., "'Precoder design in user-centric virtual cell networks," 2017 25th European Signal Processing Conference (EUSIPCO), Eurasip, Aug. 28, 2017, pp. 1055-1059, XP033236098.

* cited by examiner

METHOD AND AN APPARATUS FOR A TRANSMISSION SCHEME

TECHNICAL FIELD

Various example embodiments relate to wireless communications.

BACKGROUND

The 5G massive MIMO uses beamforming in order to maximize antenna gain for users. These schemes are essential for obtaining high gain with massive MIMO systems. Distributed MIMO has been suggested for further improving the performance. In distributed MIMO, multiple radio units (or equally remote radio units) are arranged in different locations within a cell. In other words, instead of all the antennas associated with the cell being co-located, they are distributed. Consequently, in distributed MIMO, the beamforming scheme needs to be applied to several MIMO antenna arrays (i.e., antenna panels) which are not calibrated with each other and relative responses of which cannot be assumed to be static over longer periods. This places additionally challenges to the application of the beamforming schemes.

Thus, there is a need for a beamforming solution which would provide high performance without excessive computational complexity using distributed MIMO.

BRIEF DESCRIPTION

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
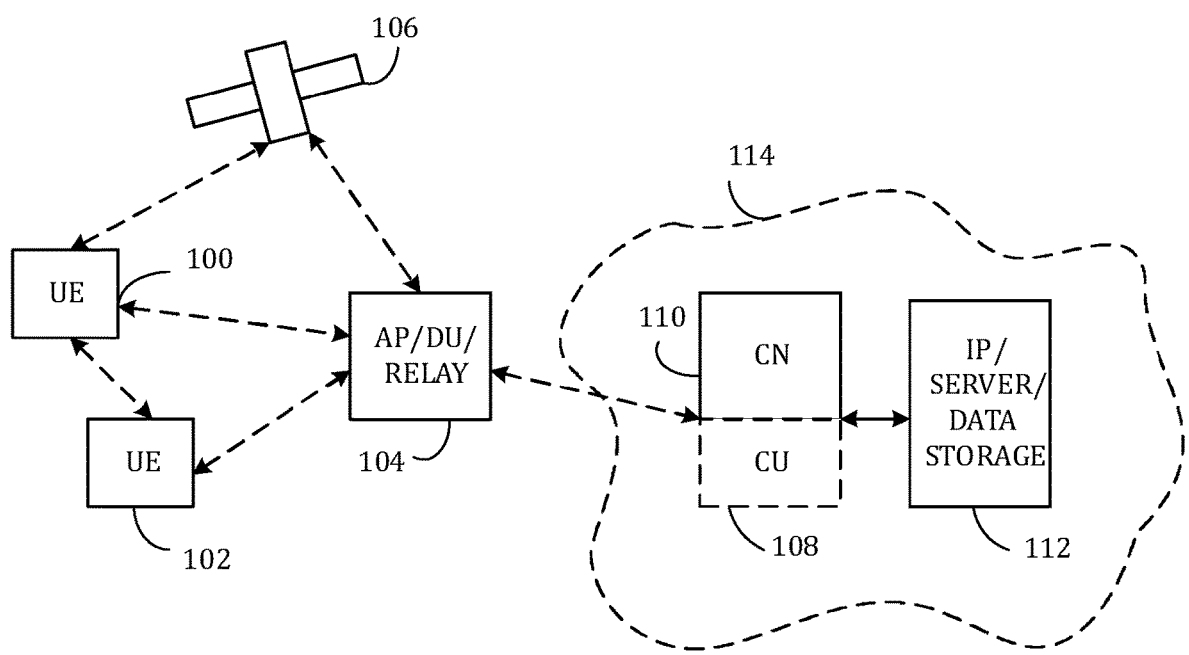
FIGS. 1 and 2 illustrate exemplary wireless communication systems according to embodiments.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell (and possibly also one or more other cells). The cells may be equally called sectors, especially when multiple cells are associated with a single access node (e.g., in tri-sector or six-sector deployment). Each cell may define a coverage area or a service area of the access node. Each cell may be, for example, a macro cell or an indoor/outdoor small cell (a micro, femto, or a pico cell). The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. Each user device may comprise one or more antennas. It should be appreciated that a user device may also be a nearly exclusive uplink only device, of which an example is a camera or video camera loading images or video clips to a network. A user device may also be a device having capability to operate in (Industrial) Internet of Things ((I)IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

The exemplifying radio access network of FIG. 1 may also comprise one or more (dedicated) IoT or IIoT devices (not shown in FIG. 1) which are able to communicate with the access node 104 only via one or more of the user devices 100, 102 (i.e., they are unable to communicate directly with the access node 104).

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using (massive) multiple input-multiple output ((m)MIMO) antennas (each of which may comprise multiple antenna elements), many more base stations or nodes than the LTE (a so-called small cell concept), including macro sites operating in co-operation with smaller stations and employing a variety of radio technologies depending on service needs, use cases and/or spectrum available. A MIMO antenna (comprising a plurality of antenna elements) may be equally called a MIMO array antenna or a MIMO antenna array (comprising a plurality of antennas). 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integratable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head (also called as a remote radio unit) or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular megaconstellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The 5G massive MIMO systems as described above require solutions for processing data for a large number of antenna elements so as to perform beamforming efficiently and effectively. These schemes are essential for obtaining high gain with massive MIMO systems. Ideally, the beamforming schemes should be such that high system performance (e.g., spectral efficiency) is obtained without excessive implementation complexity. The performance of the beamforming scheme depends on the used algorithm as well as on the type and amount of information required by said algorithm. Typically in 5G, the required information is obtained by reports sent by terminal devices and/or is based on sounding reference signal (SRS) estimation in uplink. The sounding reference signal is a reference signal transmitted by the terminal device in the uplink direction (i.e., to the access node) which may be used for estimating the uplink channel quality over a wide bandwidth. Furthermore, often the more advanced the beamforming schemes require as input more channel state information (CSI) and, as a consequence, such advanced beamforming scheme can often be quite sensitive to estimation errors. Also, the computational complexity often becomes a problem when more advanced beamforming schemes employing large amounts of CSI are used. Typically, the solutions require matrix operations which have computational complexity of $O(n^3)$. As the size of the required matrices and their number increases, the computational complexity may easily become too high for practical systems.

Well-known beamforming schemes include Grid-of-Beams (GoB), eigenbeamforming (EBB) and various Zero Forcing (ZF) schemes. In addition to the algorithms themselves being different, the aforementioned beamforming schemes differ in regard to the input information that is required by them. Typically, the GoB solutions are static (i.e., use only first order statistics), the EBB solutions operate using second order statistics and ZF solutions (and any variants thereof) use full or perfect channel state information (CSI). Full or perfect CSI corresponds to complete knowledge of the ideal channel response. Full or perfect CSI is typically not available outside simulations. From the aforementioned alternatives, the Zero Forcing schemes have the largest potential performance provided that full CSI (i.e., accurate channel matrix) is available. However, the problem with said schemes lies with obtaining high quality full CSI, e.g., using sounding reference signals (SRS), especially in interference limited scenarios and far from the cell edge. High quality (up-to-date) full CSI can be rather hard to achieve also due to the delay between channel estimation and applying the beamforming weights. High quality full CSI can often be achieved if the users (i.e., terminal devices) are static (i.e., not moving) though achieving high quality full CSI with moving users, especially users having moderate-to-high velocity, is often not feasible. Another potential problem is the high computational complexity required.

The solutions according to embodiments to be discussed below seek to improve limitations of the earlier beamforming schemes by performing beamforming in a distributed MIMO scenario, using a partitioned scheme where first, an eigenbeamforming is performed, for each individual (remote) radio unit, based on second order statistics and, second, a single-user MIMO optimization is performed between the remote radio unit for each terminal device. Optionally, in the first part, an interference aware eigenbeamforming scheme may be used for further improving the performance.

As embodiments relate to eigenbeamforming, the eigenbeamforming (and beamforming in general) is discussed here in brief in order to facilitate the discussion of the embodiments. In conventional (eigen)beamforming, the following linear channel model for a transmitter (e.g., an access node) and a single receiver (e.g., a single terminal device or, here specifically, the kth terminal device of a plurality of terminal devices) is considered:

$$y_k = H_k t_k x_k + n,$$

where $H_k$ is a channel matrix of the radio channel for the kth terminal device, $t_k$ is a pre-coding vector for the kth terminal device defining a set of beamforming weights, $y_k$ is a received signal (vector) for the kth terminal device before decoding, $x_k$ is a transmit signal for the kth terminal device (i.e., the transmitted symbol) and n is an additive receiver noise vector. Each element of the additive receiver noise vector n may be assumed to have zero mean and variance $\sigma^2$. The received signal $y_k$ is a vector which is decoded (e.g., by linearly combining its elements) by the receiver so as to form a received symbol $y_k$. The precoding vector $t_k$ serves to adjust the phases and/or amplitudes of the transmitted signal (i.e., transmitted symbols) as it is transmitted via a plurality of antennas. Based on the superposition principle of electromagnetic waves, this results in constructive interference for some radiation directions and destructive interference for other radiation directions and thus a specific transmission radiation pattern (or a specific beam) is formed. The elements of the precoding vector $t_k$ are called beamforming weights (or equally beamforming coefficients). Any of the quantities mentioned above ($y_k$, $H_k$, $t_k$, $x_k$ and n) may be complex-valued. The transmit power may be included in the pre-coding vectors $t_k$ (i.e., the pre-coding vectors are not necessarily unit vectors). In other words, transmit power $P_k$ associated with a particular pre-coding vector $t_k$ may be defined as $\|t_k\|^2 = P_k$ with $\|\ldots\|$ corresponding to norm or specifically Euclidean norm.

In eigenbeamforming, the beamforming weights of the pre-coding vector are optimized by analyzing the channel covariance matrix $R = E(H^H H)$ of the radio channel (where H is a channel matrix, H denotes the conjugate transpose operation and E denotes an expected value operation). The channel covariance matrix describes the macroscopic effects, including spatial channel correlation and average pathloss in different spatial directions. It is a well-known result that channel capacity of the radio channel is optimized when the beamforming weights are chosen to be equal to the eigenvectors of the channel covariance matrix. Channel capacity is a measure of maximal transmission rate such that arbitrarily small decoding error rate can be achieved. Thus, in eigenbeamforming, the beamforming problem becomes a problem of finding eigenvalues and eigenvectors of the channel covariance matrix. In practice, the beamforming weights are typically determined from the eigenvalue decomposition of the channel covariance matrix.

Figure 4A:
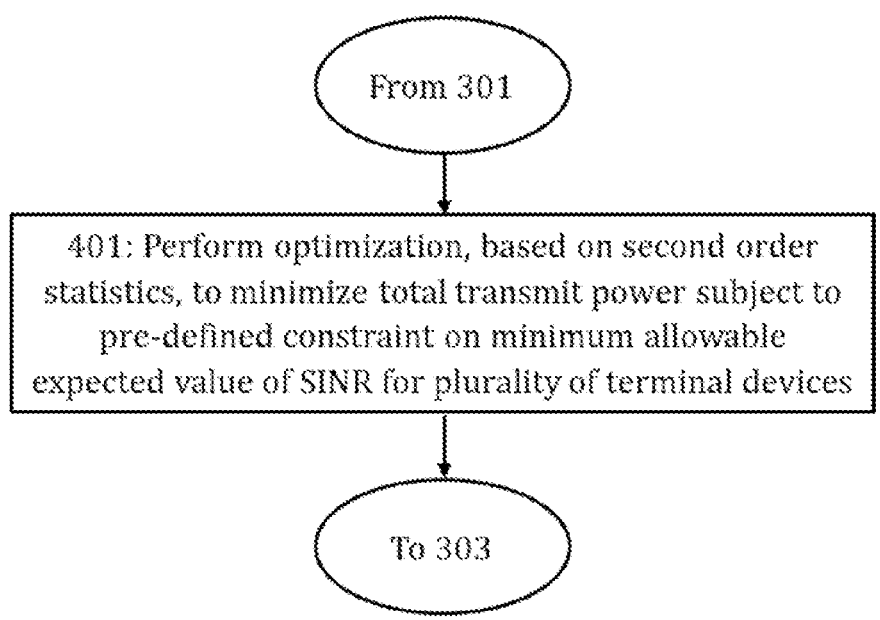
Figure 4B:
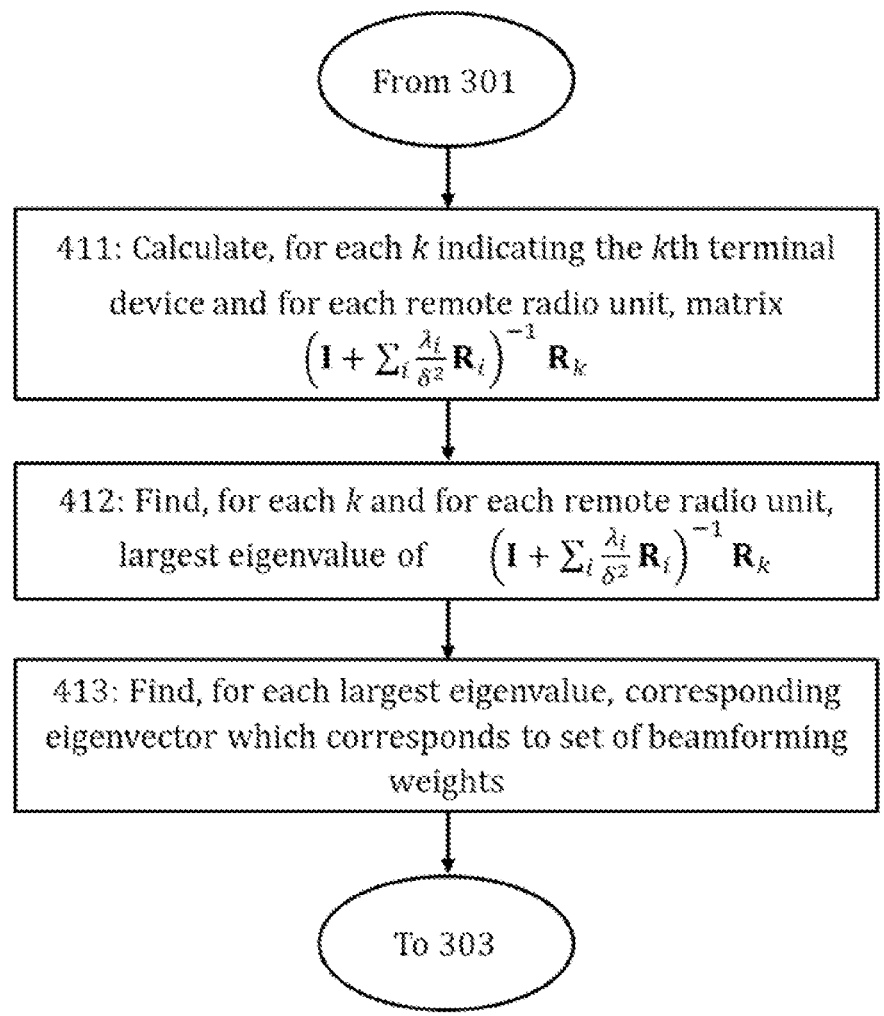

One example of a conventional eigenbeamforming using second order statistics is discussed as a special case of the interference aware eigenbeamforming scheme in relation to FIGS. 4A and 4B.

The eigenbeamforming scheme as described above may be used for forming beams for transmission to a plurality of terminal devices. However, the basic eigenbeamforming scheme does not take into account interference caused by the transmission using multiple beams. Obviously, if a first beam is used for transmission from an access node to a first terminal device and a second beam is used simultaneously for transmission from the access node to a second terminal device, the first terminal device (if located near the second terminal device) also receives the second signal and vice versa. This causes interference in the reception deteriorating the performance. Some of the embodiments seek to improve upon the conventional eigenbeamforming approach, in this regard, by introducing interference awareness to the conventional eigenbeamforming (to be discussed in detail below).

Figure 2:
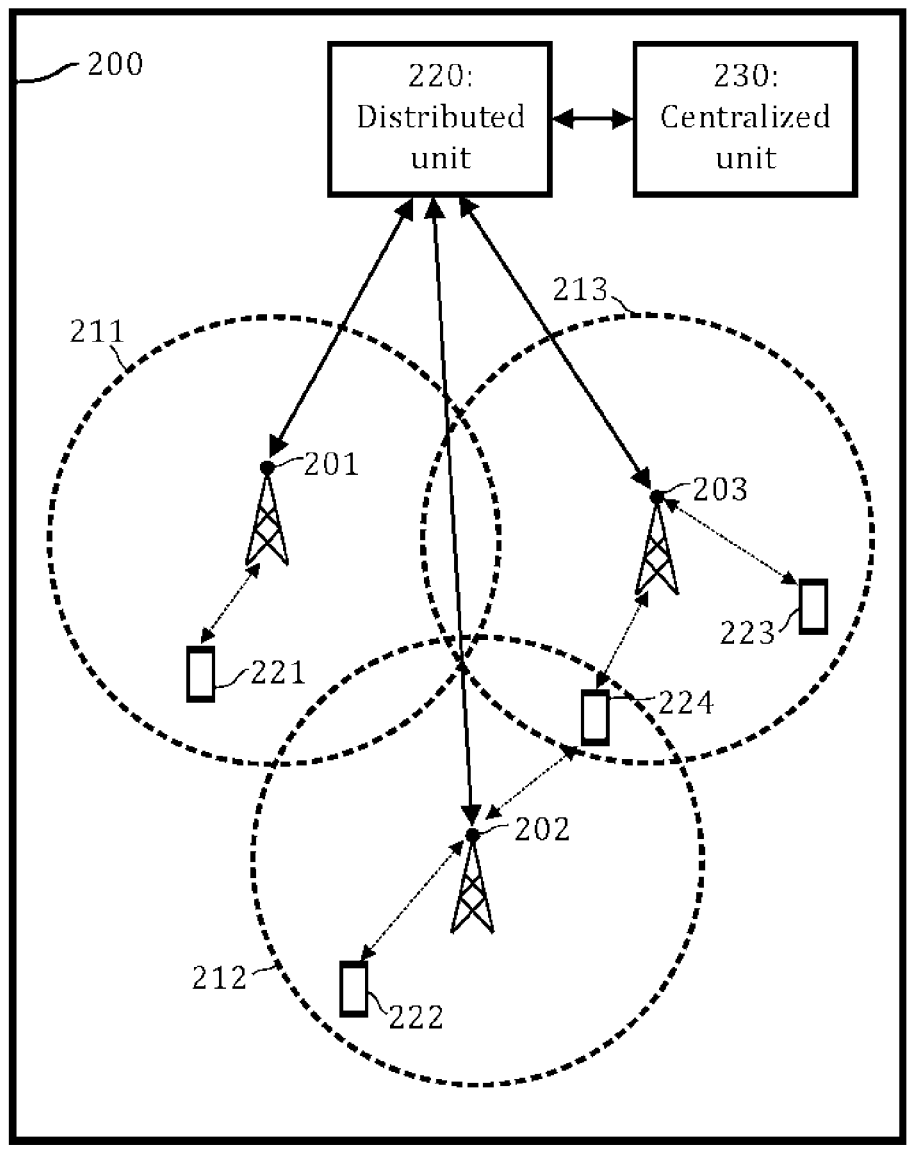

FIG. 2 illustrates another example of a communications system 200 to which some embodiments may be applied. The communications system 200 may correspond the communication system as discussed in relation to FIG. 1 or a part thereof. Therefore, any of the terminal devices 221, 222, 223, 224 may correspond to either of elements 100, 102 of FIG. 1. Moreover, the access node 104 of FIG. 1 may correspond to a combination of the elements 201, 202, 203, 220 forming a distributed access node. The illustrated communications system may be based on New Radio (NR) access technology.

Referring to FIG. 2, a communication system 200 comprises three (remote) radio units 201, 202, 203 providing respective (neighboring) cells 211, 212, 213, a distributed unit 220 connected to each of the remote radio units 201, 202, 203 via wired and/or wireless communications links and a centralized unit 230 connected to the distributed unit 220 via a wired or wireless communications link. Each of the elements 201, 202, 203, 220, 230 may be associated with the same access node (e.g., the same gNB). Each remote radio unit 201, 202, 203 may be MIMO-capable (i.e., comprise a MIMO antenna array and associated signal processing means for performing beamforming using said MIMO antenna array). Moreover, the communication system 200 comprises a plurality of terminal devices 221, 222, 223, 224 located within said cells 211, 212, 213. In other embodiments, the number of the remote radio units may be different compared to the illustrated example though to fully benefit from the distributed architecture, the access node should comprise at least two remote radio units. While FIG. 2 illustrates only a single distributed unit 220 for simplicity, in other embodiments two or more distributed units 220 connected to the same centralized unit 230 may be provided.

The communications system 200 specifically corresponds to a distributed communication system, more specifically to a distributed MIMO communication scenario. Distributed MIMO may be equally called cooperative MIMO, network MIMO, virtual MIMO or virtual antenna arrays. In distributed MIMO, a plurality of distributed antennas (or antenna arrays or panels) on different radio devices are employed to achieve improved performance in terms of gain (even close to theoretical limits of MIMO). The basic idea of distributed MIMO is to group multiple devices into a virtual antenna array to achieve MIMO communications.

Even more specifically, the illustrated communication system 200 may be configured to employ coordinated multipoint (CoMP) which is one specific type of distributed MIMO. In CoMP, data and channel state information (CSI) is shared among neighboring access points (here, remote radio units 201, 202, 203) to coordinate their transmissions in the downlink and jointly process the received signals in the uplink. The embodiments are specifically related to coordinating transmissions in downlink and thus the uplink operation may be considered optional in view of the embodiments. The basic idea in CoMP techniques is employing the otherwise harmful inter-cell interference into useful signals, enabling improvements in power gain, channel rank, and/or diversity gain.

In CoMP and in distributed MIMO in general, very-low latency exchange of information (e.g., data, control information, and CSI) between the access points 201, 202, 203 is required. For example, the information needed for scheduling may need to be available at each coordinated access point in the order of a millisecond. This low-latency information sharing may be arranged in multiple different ways. As an example, FIG. 2 illustrates a centralized solution where a distributed unit 220 capable of communication with each of the remote radio units 201, 202, 203 is provided. The distributed unit 220 may be co-located with one of the radio units 201, 202, 203 and/or with the centralized unit 230. The remote radio units 201, 202, 203 may be interconnected via the distributed unit 220 with low latency communication links in order to exchange information. The connection between the centralized unit 220 and the access nodes 201, 202, 203 may be provided via wired and/or wireless communications links. For example, optical fiber links may be employed.

Figure 3:
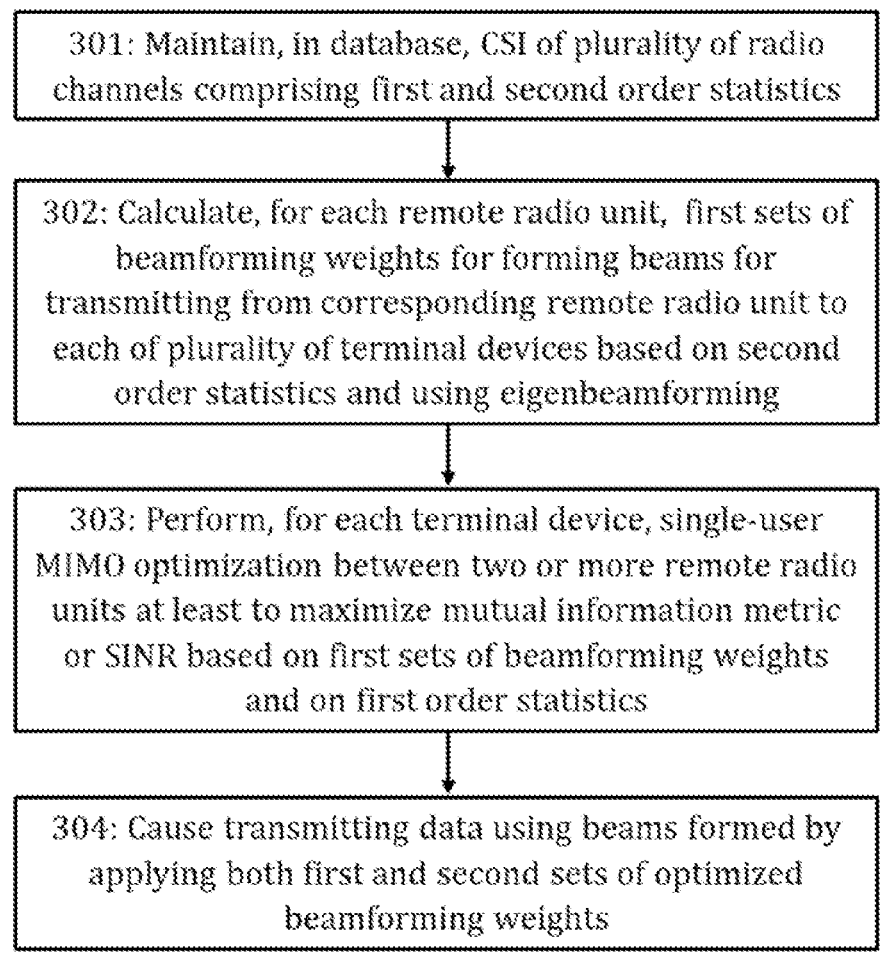
FIGS. 3, 4A, 4B and 5 illustrate exemplary processes according to embodiments.

FIG. 3 illustrates a process according to embodiments for performing beamforming optimization according to embodiments. The illustrated process of FIG. 3 may be performed by an apparatus (or computing device) for performing beamforming optimization (i.e., for calculating optimal beamforming weights). Said apparatus may be an access node (e.g., the access node 104 of FIG. 1) or a part thereof. Said apparatus may specifically be a distributed unit of an access node such as the distributed unit 220 of FIG. 2. It may be assumed that said distributed unit is connected electrically to two or more remote radio units enabling transmission to a plurality of terminal devices. Moreover, the plurality of terminal devices may be specifically configured (or scheduled) to use the same time and/or frequency resource (s) (i.e., the same physical resource block or blocks) for reception from the access node.

Referring to FIG. 3, it is initially assumed, in block 301, that the apparatus maintains, in a database, channel state information (CSI) of a plurality of radio channels. Each of the plurality of radio channels is defined to be between one of two or more remote radio units of a distributed access node and one of a plurality of terminal devices. The plurality of radio channels may encompass all combinations of a terminal device of the plurality of terminal devices and a remote radio unit of the two or more remote radio units. The channel state information comprises at least first and second order statistics of the plurality of radio channels. The plurality of terminal devices may be specifically configured (or scheduled) to use the same time and/or frequency resource (s) (i.e., the same physical resource block or blocks) for reception from the access node. The database may be an internal or external database of the apparatus. The CSI may comprise one or more (current and/or historical) channel matrices for each of the plurality of radio channels. In view of the following discussion, the plurality terminal devices may be denoted by indices $k=1, 2, \ldots, N$, where N is a positive integer larger than one indicating the number of the plurality of terminal devices. Sometimes, index i is used instead of k.

First order statistics of a radio channel only capture the static behavior of the radio channel (i.e., they describe an arithmetic mean of a data set). On the other hand, second order statistics of a radio channel are able to capture the correlation properties of the radio channel (i.e., they describe a variance of a data set with respect to the arithmetic mean or, when matrices are considered, a covariance matrix of a matrix corresponding to the data set) and are thus able to provide a dynamic representation of the system performance. In other words, the first order statistics correspond to a first moment of a data set while the second order statistics correspond to a second moment of a data set.

In some embodiments, the first order statistics of the plurality of radio channels may comprise, for each of the plurality of radio channels, at least a (short-term) channel matrix $H_k$.

The CSI maintained in the database may have been acquired and/or calculated based on, e.g., the SRS measurements performed by the access node with each of the plurality of terminal devices and/or other radio measurements (e.g., timing advance, time of arrival and/or pathloss measurements) carried out between the access node and the plurality of terminal devices. The CSI maintained in the database may be updated regularly as new radio measurements are carried out.

The apparatus calculates, in block 302, separately for each of the two or more remote radio units, first sets of beamforming weights for forming beams for transmitting from a corresponding remote radio unit to each of a plurality of terminal devices based on the second order statistics (i.e., long-term CSI) associated with the corresponding remote radio unit using an eigenbeamforming scheme. In other words, a first set of beamforming weights may be calculated for each combination of a remote radio unit of the two or more remote radio units and a terminal device of the plurality of terminal device. The beamforming using the beamforming scheme in block 302 may comprise, for each remote radio unit, performing optimization to minimize total transmit power for transmission from the remote radio unit to the plurality of terminal devices subject to a pre-defined constraint on a minimum allowable expected value of signal-to-interference-plus-noise ratio (SINR) or of signal-to-noise ratio (SNR) for the plurality of the terminal devices. In the optimization, the total transmit power may be defined based on sets of beamforming weights used for forming beams for transmitting to the plurality of terminal devices and the pre-defined constraint may be evaluated, in the optimization for each of the plurality of terminal devices, against expected values of SINR for a terminal device calculated based on the second order statistics for the terminal device (i.e., for the radio channel between the access node and the terminal device) and sets of beamforming weights for the plurality of terminal devices.

The eigenbeamforming scheme used in block 302 may be any beamforming scheme based on the eigenbeamforming principle. Specifically, the eigenbeamforming scheme may be a conventional eigenbeamforming scheme which does not take into account multi-user interference or an interference aware eigenbeamforming scheme (or any other advanced eigenbeamforming scheme). In the former case, SNR may be evaluated while in the latter case SINR may be employed instead. The interference aware eigenbeamforming scheme according to embodiments (and also briefly eigenbeamforming without taking interference into account) is discussed in detail in relation to FIGS. 4A, 4B and 5.

The apparatus performs, in block 303, for each terminal device of the plurality of terminal devices, single-user MIMO optimization between the two or more remote radio units at least to maximize a pre-defined metric based on all first sets of beamforming weights associated with transmission from the two or more remote radio units to a corresponding terminal device and on the first order statistics (i.e., short-term CSI) of radio channels between each of the two or more remote radio units and the corresponding terminal device. The result of the single-user MIMO optimization, for each terminal device, is a second set of beamforming weights to be applied for transmission to said terminal device (at the associated remote radio units). The pre-defined metric may be one of a mutual information metric and signal-to-interference-plus-noise ratio (SINR). The mutual information metric may be any known mutual information metric such as Mean Mutual Information per coded Bit (MMIB).

In the single-user MIMO optimization, a signal $y_k$ received at the kth terminal device of the plurality of terminal devices may be modelled, as:

$$y_k = \tilde{H}_k T_k W_k x_k + n,$$

wherein $\tilde{H}_k$ is a combined channel matrix for the plurality of terminal devices and the two or more remote radio units defined as $\tilde{H}_k=[H_k^{(1)}, \ldots, H_k^{(M)}]$ with $H_k^{(m)}$ being the channel matrix for the kth terminal device and mth remote radio unit and M being the number of the two or more remote radio units, $T_k=[t_k^{(1)}; \ldots; t_k^{(M)}]$ with $t_k^{(m)}$ being a pre-coding vector (a column vector) for the kth terminal device and mth remote radio unit defining a first set of beamforming weights, $W_k$ is a second pre-coding vector for the kth terminal device defining a second set of beamforming weights, $x_k$ is a transmit signal for the kth terminal device and n is an additive receiver noise vector. In other words, the matrix $\tilde{H}_k$ contains the plurality of channel matrices associated with each of the two or more remote radio units collected row-wise while the matrix $T_k$ contains the beamforming weights associated with each of the two or more remote radio units (and calculated based on second order statistics) stacked column-wise.

In some embodiments, the performing of the single-user MIMO optimization comprises, for each terminal device of the plurality of terminal devices, calculating the second set of beamforming weights $W_{k,opt}$ specifically as $$W_{k,opt} = \underset{W_k}{\operatorname{argmax}} \log(\det(I + \tilde{H}_k T_k W_k W_k^H T_k^H \tilde{H}_k^H)).$$

Here, $\log(\det(I+\tilde{H}_k T_k W_k W_k^H T_k^H \tilde{H}_k^H))$ is the mutual information metric (mentioned above) and det denotes a determinant operation. The above equation may be written equally as $$W_{k,opt} = \underset{W_k}{\operatorname{argmax}} \log(\det(I + T_k^H \tilde{H}_k^H \tilde{H}_k T_k W_k W_k^H))$$

$$= \underset{W_k}{\operatorname{argmax}} \log(\det(I + V_k \Lambda_k V_k^H W_k W_k^H)).$$

In the last equation, an eigenvalue decomposition (or equally eigendecomposition) of $T_k^H \tilde{H}_k^H \tilde{H}_k T_k$ has been carried out, where $V_k$ is a unitary matrix defining the eigenvectors of the matrix $T_k^H \tilde{H}_k^H \tilde{H}_k T_k$ and $\Lambda_k$ is a diagonal matrix defined as $\Lambda_k=\operatorname{diag}(\lambda_1, \ldots, \lambda_n)$, where $\lambda_1, \ldots, \lambda_n$, are eigenvalues of the matrix $T_k^H \tilde{H}_k^H \tilde{H}_k T_k$. Thus, it is easy to see, from said last equation, that the beamforming weights (i.e., the beam) is optimized when eigenvectors $V_k$ corresponding to the largest eigenvalues $\Lambda_k$ are chosen as the pre-coding vectors in the second set.

The optimization described in the previous paragraph correspond to rate optimization to maximize mutual information. As mentioned above, in other embodiments, SINR may be optimized (or specifically maximized) instead of the mutual information metric. Moreover, the apparatus may further perform, also in block 303, power optimization. The power optimization may be based on, for example, the water filling principle (or equally water filling algorithm) or an equal gain scheme (or equal gain allocation).

After the single-user optimization has been performed for each of the plurality of terminal devices in block 303, the apparatus causes transmitting, in block 304, data, from the two or more remote radio units to the plurality of terminal devices, using beams formed by applying both first and second sets of optimized beamforming weights at the two or more remote radio units. Specifically, the first and second set of beamforming weights may be applied according to the model $y_k=\tilde{H}_k T_k W_k x_k+n$ described above. The causing transmitting of data in block 304 may comprise transmitting, by the apparatus being a distributed unit of an access node, information on the results of the optimization (i.e., first and second sets of optimized beamforming weights) to the two or more remote radio units for performing beamforming (by said two or more remote radio units). Each remote radio unit transmits, in response to receiving said results of the optimization, data using one or more beams formed according to the first and second sets of optimized beamforming weights to the plurality of terminal devices. Obviously, only the first and second sets of beamforming weights which are to be used by a particular remote radio unit need to be transmitted to that remote radio unit.

In the beamforming optimization according to embodiments discussed above, the co-operation between separate remote radio units must be implemented using first order statistics in order to guarantee the stability of the antenna response. This requires the scheme to be frequency selective similar to Zero Forcing schemes. The advantage of the proposed scheme according to embodiments is that related matrix sizes are considerably smaller compared to Zero Forcing-based solutions. As the number of matrix manipulations typically scales with the matrix order as $O(n^3)$, the solution according to embodiments provides an improvement in computational complexity compared to prior solutions. Also, as the number of estimated parameters is reduced, added robustness against estimation errors is also provided.

In the following, the interference aware eigenbeamforming which is employed in some embodiments for performing the remote radio unit-specific optimization (i.e., actions pertaining to block 302) is described in detail in connection with FIGS. 4A, 4B and 5. It should be noted that upper indices (1), (2), ..., (M) used with $H_k$ and $t_k$ for denoting different remote radio units above is not used in relation to FIGS. 4A, 4B and 5 for simplicity of notations (and since the optimization described in relation to said Figures is performed separately for each remote radio unit and thus there is no need to distinguish between different remote radio units).

FIG. 4A illustrates a process according to embodiments for performing beamforming using an interference aware eigenbeamforming scheme according to embodiments. The illustrated process of FIG. 4A may be performed by an apparatus (or computing device) for performing beamforming optimization (i.e., for calculating optimal beamforming weights). Said apparatus may be specifically a distributed unit of a distributed access node (e.g., the distributed unit 220 of FIG. 2). It is assumed that the apparatus is connected electrically (e.g., via an optical fiber connection) to two or more remote radio units of the distributed access node.

The process illustrated in FIG. 4A may correspond to block 302 of FIG. 3. Therefore, it is assumed that the apparatus, initially, maintains channel state information (CSI) of a plurality of radio channels between two or more distributed radio units and a plurality of terminal devices in a database. The channel state information maintained in the database is assumed to comprise at least (first and) second order statistics of the plurality of radio channels.

For each remote radio unit of the two or more remote radio units, the apparatus performs, in block 401, optimization to minimize total transmit power for transmission from a corresponding remote radio unit to the plurality of terminal devices subject to a pre-defined constraint on a minimum allowable expected value of signal-to-interference-plus-noise ratio (SINR) for the plurality of the terminal devices.

In the optimization in block 401, the total transmit power is defined based on sets of beamforming weights used for forming beams for transmitting to the plurality of terminal devices. Specifically, the total transmit power may be defined as a sum of squares of (Euclidean) norms of pre-coding vectors defined for the plurality of terminal devices. A pre-coding vector for a given terminal device comprises a set of beamforming weights for forming a beam for transmitting (from a corresponding remote radio unit) to said terminal device. Thus, the result of the optimization is the total transmit power as well as the sets of (optimal) beamforming weights for the plurality of terminal device (or equally pre-coding vectors for the plurality of terminal devices). Each pre-coding vector for a terminal device may be dependent on the transmit power allocated for said terminal device and a set of normalized beamforming weights (i.e., forming a unit vector).

Moreover, the pre-defined constraint is evaluated, in the optimization in block 401 for each of the plurality of terminal devices, by calculating expected values of SINR for a terminal device based on second order statistics (e.g., channel covariance matrices) for the terminal device (i.e., for the radio channel between the access node and the terminal device) and sets of beamforming weights for the plurality of terminal devices. Further, information on noise at the receiver (i.e., additive receiver noise) may be employed in the calculation of the SINR. Specifically, the desired signal part of the SINR, for a terminal device, may be calculated based on the second order statistics (e.g., a channel covariance matrix) for said terminal device and on a set of beamforming weights for said terminal device while the interference part of the SINR may be calculated based on the second order statistics (e.g., channel covariance matrices) for the terminal device and on the set of beamforming weights for the plurality of terminal devices excluding said terminal device.

The first set of optimized beamforming weights, for each of the two or more remote radio units, resulting from the optimization in block 401 may be specifically the set of beamforming weights corresponding to the minimized total transmit power (that is, minimized subject to the pre-defined constraint) for transmission from a corresponding remote radio unit to the plurality of terminal devices.

It should be noted that the full solution to the beamforming problem is solved typically by means of an iterative process. First, a set of power values for the plurality of terminal devices may be defined and corresponding sets of beamforming weights may be optimized. Thereafter based on the SINR calculated for each terminal device, the power values may be modified and subsequently the process may be repeated with the updated power values. These steps may be repeated until certain pre-defined conditions (for the SINR) have been satisfied.

In some embodiments, the transmit power allocated for each terminal device of the plurality of terminal devices may be pre-defined. The power may be distributed between the plurality of terminal devices, e.g., based on pathloss and/or spatial correlation.

It should be emphasized that the optimization in block 401 is performed specifically based on said second order statistics of the plurality of radio channels (maintained in the database) taking into account, in contrast to the linear channel model discussed in relation to conventional eigen-beamforming, also interference resulting from transmission using multiple beams, i.e., inter-stream interference (as is evident also from the fact that SINR is considered in the optimization). As interference is taken into account in the optimization in block 401, the optimization, for each remote radio unit, is effectively based on the following linear channel model:

$$y_k = H_k t_k x_k + \sum_{i \neq k} H_k t_i x_i + n,$$

where $y_k$ is a received signal (vector) at the kth terminal device of the plurality of terminal devices, as $H_k$ is a channel matrix for the kth terminal device, $t_k$ is a pre-coding vector for the kth terminal device defining a set of beamforming weights, $x_k$ is a transmitted signal (or symbol) for the kth terminal device, n is additive receiver noise vector (where each element may have zero mean and variance $\sigma^2$) and a sum of $\sum_{i \neq k} H_k t_i x_i$ is calculated over all but one of the plurality of terminal devices. Said sum of $\sum_{i \neq k} H_k t_i x_i$ corresponds to (multiuser) interference resulting from simultaneous transmissions to other terminal devices using corresponding other beams. Preferably, the pre-coding vectors of the plurality of terminal devices should be selected such that these interference terms are minimized. It should be noted that the above equation may be equally written as:

$$y_k = \sum_i H_k t_i x_i + n,$$

where the sum is calculated over all of the plurality of terminal devices (i.e., over i=1, ..., N). As mentioned above, the transmit power may be included in the pre-coding vectors $t_k$ (i.e., the pre-coding vectors are not necessarily unit vectors). In other words, transmit power $P_k$ associated with a particular pre-coding vector $t_k$ may be defined as $\|t_k\|^2 = P_k$.

The performing of the optimization in block 401 may comprise specifically solving, for each remote radio unit, an optimization problem formulated, using the notation introduced in the previous paragraph, as:

$$\min_i \sum_i \|t_i\|^2$$

subject to $$\gamma \leq \frac{t_k^H R_k t_k}{\sum_{i \neq k} t_i^H R_k t_i + \delta^2} \text{ for all } k,$$

where i and k are indices indicating the ith and kth terminal device of the plurality of terminal device, $t_i$ is a pre-coding vector for the ith terminal device defining a set of beamforming weights, $\gamma$ is the minimum allowable expected value of SINR (of the pre-defined constraint), $\delta^2$ is a noise term (which may be equal to noise variance $\sigma^2$), $R_k$ is a channel covariance matrix $E(H_k^H H_k)$ with $H_k$ being a complex non-deterministic channel matrix for the kth terminal device, E denoting an expected value and H denoting a conjugate transpose operation. Further, the sum of $\sum_{i \neq k} t_i^H R_k t_i$ is calculated over all but one of the plurality of terminal devices, $t_k^H R_k t_k$ corresponds to a received desired signal power for the kth terminal device and $\sum_{i \neq k} t_i^H R_k t_i$ corresponds to a total received interference power for the kth terminal device. The term $\Sigma_i \|t_i\|^2$ corresponds to the total transmit power.

In some embodiments, the solving of the optimization problem for each remote radio unit described above in relation block 401 comprises solving an equivalent (eigenvalue) problem defined through the equation (defined here for the kth terminal device of the plurality of terminal devices):

$$\left(I + \sum_i \frac{\lambda_i}{\delta^2} R_i\right)^{-1} R_k t_k = \frac{\delta^2}{\lambda_k}\left(\frac{\gamma}{\gamma+1}\right) t_k,$$

where I is an identity matrix, $\lambda_i$ is a Lagrangian multiplier for the ith terminal device relating to total transmit power P through $\Sigma_i \lambda_i = \Sigma_i \|t_i\|^2 = P$ at optimal solution ($\| \ldots \|$ corresponding to norm or specifically Euclidean norm). Specifically, the optimal beamforming weights for the plurality of terminal devices $t_k$ (for k=1, 2, . . . , N) are found as corresponding eigenvectors of the above equation. A proof for the equivalency of the original optimization problem and the equivalent problem is provided following the discussion on the solving the equivalent problem.

In some embodiments, the Lagrangian multiplier $\lambda_i$, for all i (i.e., for all of the plurality of terminal devices), may have a pre-defined value. Said pre-defined value may or may not be different for different i indices. In some embodiments, the Lagrangian multiplier $\lambda_i$ may have the same value for all i. This definition would guarantee fairness of power allocation between terminal devices.

In other embodiments, the Lagrangian multiplier $\lambda_i$, for all i (i.e., for all of the plurality of terminal devices) may not have a pre-defined value. In such cases, the values of the Lagrangian multiplier $\lambda_i$ are determined through iteration during the optimization process.

Specifically, the performing of the optimization in block 401 may comprise performing, by the apparatus, a process as illustrated in FIG. 4B. The illustrated process is based on solving the equivalent problem defined above.

Referring to FIG. 4B, the apparatus may perform the following separately for each remote radio unit of the two or more remote radio units. Initially, the apparatus calculates, in block 411, for each k indicating the kth terminal device of the plurality of terminal devices, a matrix defined as $$\left(I + \sum_i \frac{\lambda_i}{\delta^2} R_i\right)^{-1} R_k.$$

The matrix inversion $$\left(I + \sum_i \frac{\lambda_i}{\delta^2} R_i\right)^{-1}$$

may be calculated only once to simplify the calculation. In other words, the calculation in block 211 may comprise effectively two steps: 1) calculating a matrix inversion $$\left(I + \sum_i \frac{\lambda_i}{\delta^2} R_i\right)^{-1}$$

and 2) multiplying the inverted matrix calculated in the first step with a matrix $R_k$ separately for each terminal device of the plurality of terminal devices (i.e., for each k with k=1, 2, . . . , N). Then, the apparatus finds, in block 412, for each k indicating the kth terminal device of the plurality of terminal devices, the largest eigenvalue $$\left(I + \sum_i \frac{\lambda_i}{\delta^2} R_i\right)^{-1} R_k.$$

Here, the largest eigenvalue for each index k corresponds to a minimum of the total transmit power (while also fulfilling the pre-defined constraint). This property is evident from the equation for the equivalent problem provided above having a form similar to the well-known equation $Av = \lambda v$ describing the fundamental connection between an eigenvalue $\lambda$ and an eigenvector v of a matrix A. The finding of the largest eigenvector in block 412 may be performed using any conventional method such as using power iteration. Finally, the apparatus finds, in block 213, for each largest eigenvalue, a corresponding eigenvector. Each eigenvector corresponds, here, to a set of optimal beamforming weights (that is, optimal in terms of the aforementioned optimization problem) for a terminal device of the plurality of terminal devices. The eigenvectors corresponding to each eigenvalue may be found by solving the equation $$\left(I + \sum_i \frac{\lambda_i}{\delta^2} R_i\right)^{-1} R_k t_k = \lambda_{eigen,k} t_k$$

for all k (i.e., for all of the plurality of terminal devices), where $\lambda_{eigen,k}$ is the largest eigenvalue for the kth terminal device.

If we change perspective to a fixed power constraint $\Sigma_i \|t_i\|^2 \leq P$ and optimize SINR for each terminal device of the plurality of terminal devices, given the optimal SINR values $\gamma_k$ for each terminal device (i.e., for each k), we also know the beams from the solution given above. That solution must fulfill also said fixed power constraint. Thus, by knowing the solution to the aforementioned optimization problem or to the equivalent eigenvalueproblem, a solution is also provided to this alternative problem. In other words, if we optimize the SINR subject to the fixed power constraint, the resulting beams have the same shape (i.e., the derived optimal beamforming weights are the same) as when the aforementioned optimization problem or to the equivalent eigenvalueproblem is solved.

In the following, a few comments are provided regarding certain advantages of the interference aware eigenbeamforming solution according to embodiments. Firstly, the derived algorithm is based on second order statistics and allows averaging over time and frequency. In other words, the solution is effectively static in nature. This improves the estimation accuracy of the required input. The beam derivation is also constant over frequency for a given set of scheduled terminal devices. Thus, there is only one shared matrix inversion for all frequency resources and set of scheduled terminal devices (i.e., the solution needs to be calculated only once). Finding the largest eigenvalues and the corresponding eigenvectors for each of the plurality of terminal device is, then, a relatively simple operation with, e.g., using power method. As a comparison, the Zero Forcing scheme needs to be calculated separately for different frequency resources. As an example, a 100 MHz wide 5G carrier has 273 physical resource blocks (PRB). To get the frequency selective ZF solutions the equations need to be solved 273 times. If the scheduled terminal devices occupy the whole bandwidth, the proposed solution in the given example needs to be solved only once.

In the following, a proof for equivalency of the original optimization problem and the equivalent (eigenvalue) problem as described above is provided for completeness. The starting point is the aforementioned optimization problem formulated as:

$$\min \sum_i \|t_i\|^2$$

subject to a (pre-defined) constraint $$\gamma \leq \frac{t_k^H R_k t_k}{\sum_{i \neq k} t_i^H R_k t_i + \delta^2} \text{ for all } k.$$

The above constraint for y may be rewritten as $$\frac{1}{\gamma \delta^2} t_k^H R_k t_k \geq \sum_{i \neq k} \frac{1}{\delta^2} t_i^H R_k t_i + 1.$$

Now, an additional vector variable a is introduced so that we have:

$$\frac{1}{\gamma \delta^2} t_k^H a a^H t_k \geq \sum_{i \neq k} \frac{1}{\delta^2} t_i^H a a^H t_i + 1$$

with $$t_k^H a a^H t_k = t_k^H R_k t_k.$$

Then, the pre-defined constraint may be written as $$\sqrt{\frac{1}{\gamma \delta^2} \text{Re}(t_k^H a a^H t_k)} \geq \sqrt{\sum_{i \neq k} \frac{1}{\delta^2} t_i^H R_k t_i + 1}.$$

Notably, this is a second order cone program (SOCP) constraint while $t_k^H a a^H t_k = t_k^H R_k t_k$ is a corresponding equality constraint. The Slater's condition can be fulfilled and thus it follows that the Karush-Kuhn-Tucker (KKT) conditions define the optimal solution. Therefore, we write a Lagrangian function $J(t_k)$ of the aforementioned pre-defined constraint:

$$J(t_k) = \sum_k \frac{1}{\delta^2} t_k^H t_k + \sum_k \lambda_k \left( \sum_{i \neq k} \frac{1}{\delta^2} t_i^H R_k t_i + 1 - \frac{1}{\gamma \delta^2} t_k^H R_k t_k \right),$$

where $\lambda_k$ is Lagrangian multiplier associated with kth SINR constraint (i.e., with kth terminal device). The dual function is $\min_{t_1, \ldots, t_K} J(t_k) = \Sigma_k \lambda_k$ and the strong duality implies that it equals to the total power $\Sigma_k \|t_k\|^2$ at the optimal solution. Exploiting the stationary KKT conditions which state that $\partial J(t_k)/\partial_k = 0$ for $k=1, \ldots, K$ at the optimal solution, we write (note that the indices are manipulated to a different order)

$$\frac{\partial J(t_k)}{\partial t_k} = t_k + \left( \sum_{i \neq k} \frac{\lambda_i}{\delta^2} R_i t_k - \frac{\lambda_k}{\gamma \delta^2} R_k t_k \right) =$$

$$0 \Leftrightarrow \left( 1 + \sum_i \frac{\lambda_i}{\delta^2} R_i \right) t_k = \frac{\lambda_k}{\delta^2} \left( 1 + \frac{1}{\gamma} \right) R_k t_k.$$

By further moving the terms around, we get as a final result:

$$\left( 1 + \sum_i \frac{\lambda_i}{\delta^2 R_i} \right)^{-1} R_k t_k = \frac{\delta^2}{\lambda_k} \left( \frac{\gamma}{\gamma + 1} \right) t_k.$$

It should be noted that the proposed beamforming scheme as described in relation to FIGS. 4A and 4B converges to conventional eigenbeamforming as the amount of interference (i.e., the term $\Sigma_{i \neq k} t_i^H R_k t_i$) goes to zero or as signal-to-noise ratio approaches zero. Thus, the proposed beamforming scheme may be called Interference Aware Eigenbeamforming.

As described above, the conventional eigenbeamforming (which does not take into account interference) may be derived from the interference aware eigenbeamforming by assuming that there is no interference, i.e., assuming that $\Sigma_{i \neq k} t_i^H R_k t_i = 0$ for all k. In such a case, the SINR corresponds to SNR. As the embodiments are not limited to using interference aware eigenbeamforming but may, alternatively, use any conventional eigenbeamforming schemes which ignore the interference, the (interference unaware) eigenbeamforming scheme derivable from the interference aware eigenbeamforming is discussed here briefly in view of the above discussion for completeness. In general, the above discussion as well as the discussion in relation to FIG. 5 applies to the conventional eigenbeamforming with the additional assumption that the amount of interference is zero in all cases (i.e., for all terminal devices). This means, for example, that the optimization problem can be written as:

$$\min \sum_i \|t_i\|^2$$

subject to $$\gamma \leq \frac{t_k^H R_k t_k}{\delta^2} \text{ for all } k,$$

where the term $t_k^H R_k t_k / \delta^2$ corresponds to signal-to-noise ratio (SNR) and correspondingly y is a minimum allowable expected value of SNR. Moreover, the equivalent eigenvalue problem may be written simply as $$R_k t_k = \frac{\delta^2 \gamma_k}{\lambda_k} t_k.$$

Figure 5:
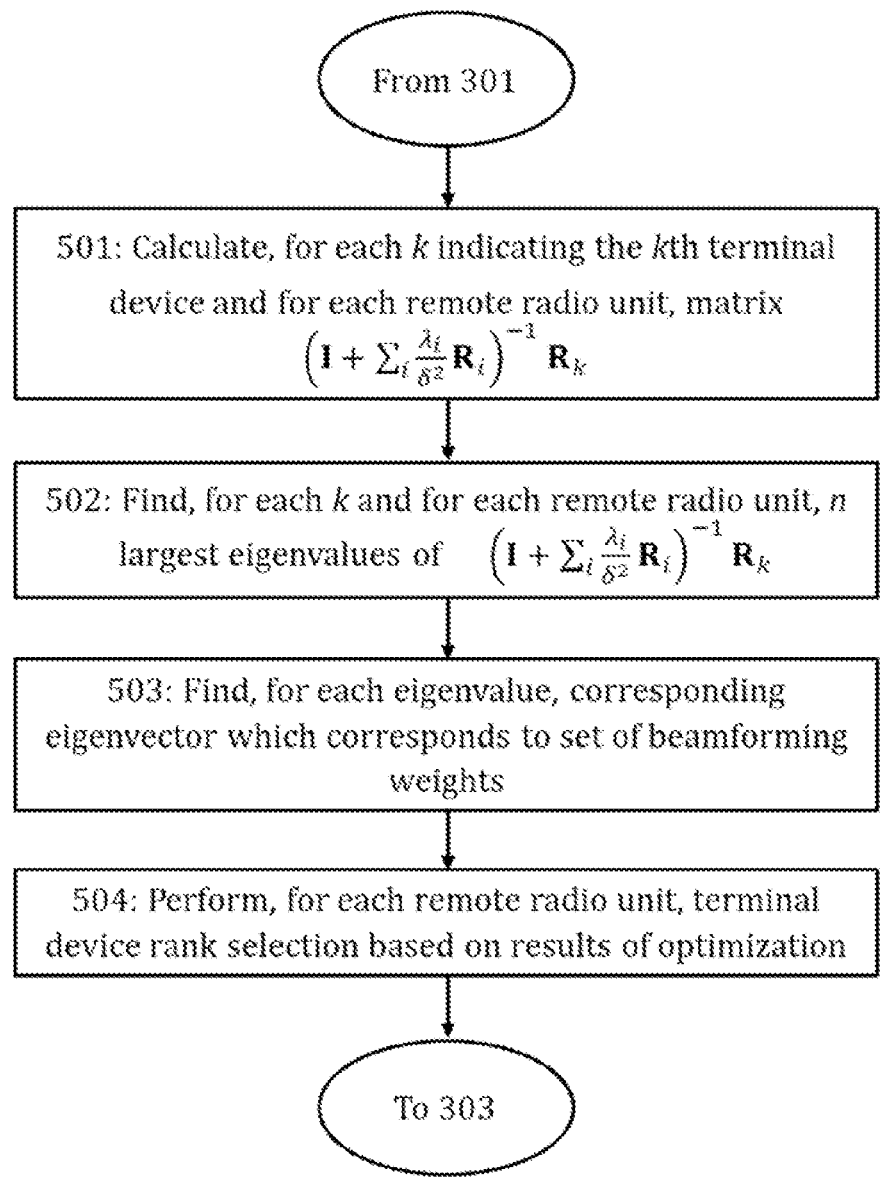

FIG. 5 illustrates another process according to embodiments for performing interference aware eigenbeamforming according to embodiments. The illustrated process of FIG. 4A may be performed by an apparatus (or computing device) for performing beamforming optimization (i.e., for calculating optimal beamforming weights). Said apparatus may be specifically a distributed unit of a distributed access node (e.g., the distributed unit 220 of FIG. 2). It is assumed that the apparatus is connected electrically (e.g., via an optical fiber connection) to two or more remote radio units of the distributed access node.

The illustrated process of FIG. 5 may correspond, similar to FIGS. 4A and 4B, to one embodiment of the process discussed in relation to block 302 of FIG. 3. Also similar to FIGS. 4A and 4B, it is, initially, assumed that the apparatus maintains channel state in-formation (CSI) of a plurality of radio channels between two or more distributed radio units and a plurality of terminal devices in a database. The channel state information maintained in the database is assumed to comprise at least (first and) second order statistics of the plurality of radio channels.

Referring to FIG. 5, the actions illustrated by blocks 501 to 504 may be performed separately for each remote radio unit of the two or more remote radio units (similar to as discussed in relation to FIGS. 4A and 4B). In the following, the process is discussed for a single remote radio unit for simplicity. Block 501 may correspond to block 411 of FIG. 4B and is, thus, not discussed here (again) for brevity. After the matrix $$\left(I + \sum_i \frac{\lambda_i}{\delta^2} R_i\right)^{-1} R_k$$

has been calculated for all k (i.e., for all of the plurality of terminal devices) in block 501, the apparatus finds, in block 502, n largest eigenvalues of $(I+\Sigma_i \lambda_i/\delta^2 R_i)^{-1} R_k$ separately for each k indicating the kth terminal device of said plurality of terminal devices. Here, n is an integer larger than one. Furthermore, the apparatus finds, in block 503, for each of the n largest eigenvalues, a corresponding eigenvector. Each eigenvector corresponds, here, to a set of optimal beamforming weights for a MIMO layer of a terminal device of said at least one terminal device. In other words, the n eigenvectors found in block 503 for a certain terminal device are orthogonal eigenvectors for that terminal device. Thus, by selecting several largest eigenvector, one gets several orthogonal beams for separate MIMO layers. This property is enabled by the fact that the provided solution according to embodiments works with correlation matrices which, by definition, have a rank which is larger than one.

In some embodiments, the n largest eigenvalues and corresponding eigenvectors may be calculated, in blocks 502, 503, only for some of the plurality of terminal devices (i.e., for at least one terminal device of the plurality of terminal devices) and only for some of the two or more remote radio units (i.e., for at least one remote radio unit of the two or more remote radio units). In other words, blocks 502, 503 may be carried out for at least one combination of a terminal device of the plurality of terminal devices and a remote radio unit of the two or more remote radio units. For the other combinations of a terminal device and remote radio unit, only the largest eigenvalue may be calculated in block 502 and a single corresponding eigenvector may be calculated in block 503, similar to as discussed in relation to FIG. 4B.

Once multiple eigenvectors have been calculated, in block 503, for the plurality of terminal devices (or for at least some of them), the apparatus performs, in block 504, rank selection for the plurality of terminal device (or at least for at least one terminal device of the plurality of terminal devices) based on results of the optimization. In other words, the apparatus may determine, in block 504, how many MIMO streams (i.e., how many orthogonal beams) should be used for transmission to a given terminal device. This determination may be based on, e.g., values (or magnitudes) of the calculated eigenvalues. For example, if the ratio between the largest and second largest eigenvalues for a given terminal device is not too large (i.e., said ratio is below a certain pre-defined limit), a high-quality channel for a higher rank (higher SU-MIMO order) may be determined to be available in block 504 and thus may be used for transmission. In other words, beamforming weights defined by the eigenvectors associated with the largest eigenvalue and the second largest eigenvalue are used for transmission to the corresponding terminal device. In general (with n being any integer larger than one), the aforementioned ratio for lth largest eigenvalue may be calculated as a ratio between the largest eigenvalue and lth largest eigenvalue, where l is an integer larger than one. In some embodiments, the rank for each of the plurality of terminal devices (or at least some of them) may be pre-defined.

After block 504 (that is, after the process described above has been carried out for each remote radio unit), the process proceeds to block 304 of FIG. 3, that is, to the single-user MIMO optimization between different remote radio units. All of the pre-coding vectors selected through rank selection in block 504 may be taken into account in the single-user MIMO optimization in block 304 of FIG. 3.

At least some of the processes discussed in relation to FIGS. 3, 4A, 4B and 5 may be carried out in parallel with each other and/or in different order as presented above.

The blocks, related functions, and information exchanges described above by means of FIGS. 3, 4A, 4B and 5 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 6:
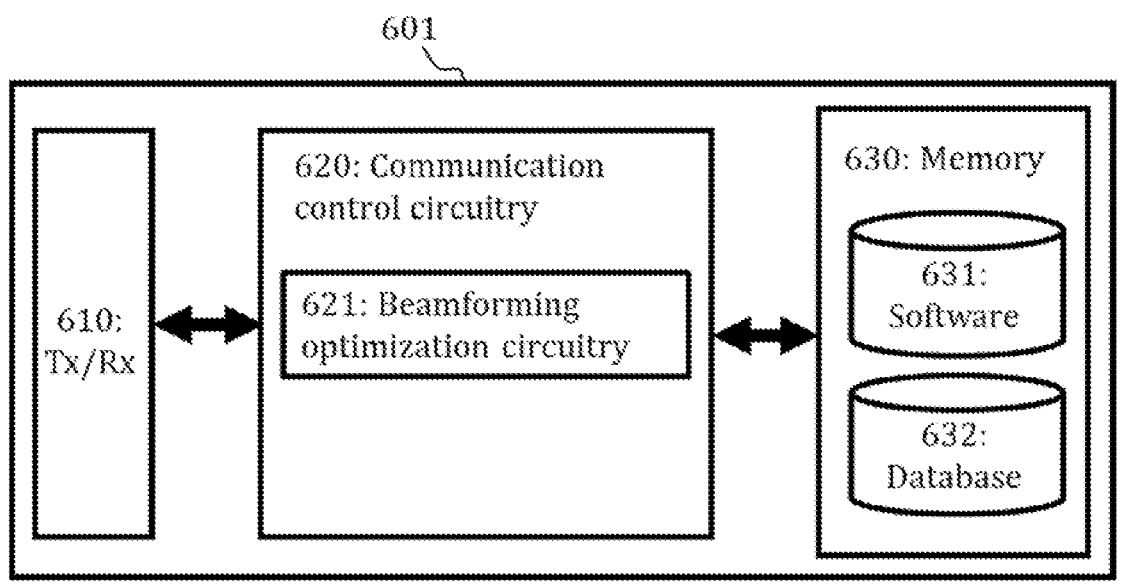
FIG. 6 illustrates an apparatus according to embodiments.

FIG. 6 provides an apparatus 601 at least for performing beamforming optimization. Specifically, FIG. 6 may illustrate an access node (or a sub-unit thereof) for performing beamforming optimization and beamforming itself. In some embodiments, the apparatus 601 may correspond to the access node 104 of FIG. 1 (or a part thereof). FIG. 6 may, alternatively or more specifically, illustrate a distributed unit of a distributed access node (e.g., a distributed gNB).

The apparatus 601 may comprise one or more communication control circuitry 620, such as at least one processor, and at least one memory 630, including one or more algorithms 631, such as a computer program code (software) wherein the at least one memory and the computer program code (software) are configured, with the at least one processor, to cause the apparatus to carry out any one of the exemplified functionalities of the apparatus (i.e., of the distributed unit of an access node) described above. Said at least one memory 630 may also comprise at least one database 632.

Referring to FIG. 6, the one or more communication control circuitry 620 comprise at least beamforming optimization circuitry 621 which is configured to optimize beamforming weights associated with transmission to a plurality of terminal devices and cause (i.e., at least trigger and possibly also perform) beamforming based on results of the optimization. To this end, the beamforming optimization circuitry 621 is configured to carry out at least some of the functionalities described above by means of any of FIGS. 3, 4A, 4B and 5 using one or more individual circuitries.

In some embodiments, the one or more communication control circuitry 620 may further comprise beamforming circuitry for performing the beamforming (i.e., actually forming beams and transmitting data using said beams, as opposed to merely determining optimal beamforming weights). This may be the case, namely, if the apparatus corresponds to an access node or specifically a distributed access node comprising at least one centralized unit, at least one distributed unit and at least two remote radio units.

Referring to FIG. 6, the memory 630 may be implemented using any suitable data storage technology, such as semiconductor based memory devices, flash memory, magnetic memory devices and systems, optical memory devices and systems, fixed memory and removable memory.

Referring to FIG. 6, the apparatus 601 may further comprise different interfaces 610 such as one or more signaling interfaces (TX/RX) comprising hardware and/or software for realizing communication connectivity according to one or more communication protocols. Specifically, if the apparatus 601 corresponds to a distributed unit of an access node, the one or more signaling interfaces 610 may comprise, for example, interfaces providing a connection to two or more remote radio units, at least one centralized unit of the access node, one or more other access nodes (or sub-units therein) and/or to one or more (external) computing devices. The one or more signaling interfaces 610 may provide the apparatus with communication capabilities to communicate (possibly via one or more computing devices such as an access node) in a cellular or wireless communication system, to access the Internet and a core network of a wireless communications network and/or to enable communication between user devices (terminal devices) and different network nodes or elements, for example. The one or more signaling interfaces 610 may comprise standard well-known components such as an amplifier, filter, frequency-converter, (de)modulator, and encoder/decoder circuitries, controlled by the corresponding controlling units, and one or more antennas.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware. The term 'circuitry' also covers, for example and if applicable to the particular claim element, a baseband integrated circuit for an access node or a terminal device or other computing or network device.

In an embodiment, at least some of the processes described in connection with FIGS. 3, 4A, 4B and 5 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3, 4A, 4B and 5 or operations thereof.

Embodiments as described may also be carried out in the form of a computer process defined by a computer program or portions thereof.

Embodiments of the methods described in connection with FIGS. 3, 4A, 4B and 5 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for performing beamforming optimization for a distributed multiple-in multiple-out, MIMO, architecture, the apparatus comprising:
   at least one processor; and
   at least one memory including computer program code, the at least one memory and the computer program code being configured, with the at least one processor, to cause the apparatus to perform:

maintaining, channel state information of a plurality of radio channels, wherein each of the plurality of radio channels is between one of two or more radio units of a distributed access node and one of a plurality of terminal devices and the channel state information comprises first and second order statistics of the plurality of radio channels;

calculating, separately for each of the two or more radio units using an eigenbeamforming scheme, first sets of beamforming weights for forming beams for transmitting from a corresponding remote radio unit to each of a plurality of terminal devices based on the second order statistics associated with the corresponding radio unit;

performing, for each terminal device of the plurality of terminal devices, single-user MIMO optimization between the two or more radio units at least to maximize a pre-defined metric based on all first sets of beamforming weights associated with transmission from the two or more radio units to a corresponding terminal device and on the first order statistics of radio channels between each of the two or more radio units and the corresponding terminal device, wherein the pre-defined metric is a mutual information metric or signal-to-interference-plus-noise, SINR, and a result of the single-user MIMO optimization, for each terminal device, is a second set of beamforming weights to be applied for transmission to said terminal device; and causing transmitting data, from the two or more radio units to the plurality of terminal devices, using beams formed by applying both first and second sets of optimized beamforming weights at the two or more radio units.

2. The apparatus according to claim 1, wherein a signal $y_k$ received at the kth terminal device of the plurality of terminal devices is modelled, in the single-user MIMO optimization, as:

$$y_k = \tilde{H}_k T_k W_k x_k + n,$$

wherein $\tilde{H}_k$ is a combined channel matrix for the plurality of terminal devices and the two or more remote radio units defined as $\tilde{H}_k = [H_k^{(1)}, \ldots, H_k^{(M)}]$ with $H_k^{(m)}$ being the channel matrix for the kth terminal device and mth radio unit and M being the number of the two or more radio units, $T_k = [t_k^{(1)}; \ldots ; t_k^{(M)}]$ with $t_k^{(m)}$ being a pre-coding vector for the kth terminal device and mth radio unit defining a first set of beamforming weights, $W_k$ is a second pre-coding vector for the kth terminal device defining a second set of beamforming weights, $x_k$ is a transmit signal for the kth terminal device, n is an additive receiver noise vector.

3. The apparatus according to claim 2, wherein the performing of the single-user MIMO optimization to maximize the pre-defined metric being the mutual information metric comprises, for each terminal device of the plurality of terminal devices: calculating a second set of beamforming weights $W_{k,opt}$ as $$W_{k,opt} = {}_{W_k}^{argmax} \log(\det(I + \tilde{H}_k T_k W_k W_k^H T_k^H \tilde{H}_k^H)),$$

wherein $\log(\det(I + \tilde{H}_k T_k W_k W_k^H T_k^H \tilde{H}_k^H))$ is the mutual information metric.

4. The apparatus according to claim 1, wherein the at least one memory and the computer program code are configured, with the at least one processor, to cause the apparatus to further perform:

performing, for each terminal device of the plurality of terminal devices, further single-user MIMO optimization to optimize power according to a water filling principle or an equal gain scheme.

5. The apparatus according to claim 1, wherein the eigenbeamforming scheme is an eigenbeamforming scheme which does not take into account multiuser interference.

6. The apparatus according to claim 1, wherein the eigenbeamforming scheme is an interference aware eigenbeamforming scheme, the calculating of the beamforming weights using the interference aware eigenperforming scheme comprising, for each combination of a radio unit of the two or more radio units and a terminal device of the plurality of terminal devices:

performing optimization to minimize total transmit power for transmission to the plurality of terminal devices subject to a pre-defined constraint on a minimum allowable expected value of SINR for the plurality of the terminal devices, wherein the total transmit power is defined, in the optimization, based on sets of beamforming weights used for forming beams for transmitting to the plurality of terminal devices and the pre-defined constraint is evaluated, in the optimization for each of the plurality of terminal devices, by calculating SINR values for a terminal device based on second order statistics for the terminal device and the sets of beamforming weights for the plurality of terminal devices.

7. The apparatus according to claim 6, wherein the second order statistics of the plurality of radio channels comprise, for each of the plurality of radio channels, a channel covariance matrix, said channel covariance matrix being used for calculating values of SINR for a corresponding terminal device for satisfying the pre-defined constraint.

8. The apparatus according to claim 6, wherein a signal $y_k$ received at the kth terminal device of the plurality of terminal devices is modelled, in the optimization for each remote radio unit of the two or more remote radio units, as:

$$y_k = H_k t_k x_k + \sum_{i \neq k} H_k t_i x_i + n,$$

wherein $H_k$ is a channel matrix for the kth terminal device, $t_k$ is a pre-coding vector for the kth terminal device defining a first set of beamforming weights, $x_k$ is a transmit signal for the kth terminal device, n is an additive receiver noise vector and a sum of $\sum_{i \neq k} H_k t_i x_i$ is calculated over all but one of the plurality of terminal devices.

9. The apparatus according to claim 6, wherein the performing of the optimization comprises solving, for each radio unit of the two or more remote radio units, an optimization problem formulated as:

$$\min \sum_i \|t_i\|^2$$

subject $$\gamma \leq \frac{t_k^H R_k t_k}{\sum_{i \neq k} t_i^H R_k t_i + \delta^2} \text{ for all } k,$$

wherein i and k are indices indicating the ith and kth terminal device of the plurality of terminal device, $t_{i/k}$ is a pre-coding vector for the ith/kth terminal device defining a first set of beamforming weights, $\gamma$ is the minimum allowable expected value of SINR, $\delta^2$ is a noise term, $R_k$ is a channel covariance matrix $E(H_k^H H_k)$ with $H_k$ being a complex non-deterministic channel matrix for the kth terminal device, E denoting an expected value and H denoting a conjugate transpose operation, $t_k^H R_k t_k$ corresponding to a received desired signal power for the kth terminal device and $\Sigma_{i \neq k} t_i^H R_k t_i$ corresponding to a total received interference power for the kth terminal device.

10. The apparatus according to claim 6, wherein the performing of the optimization, for each radio unit of the two or more radio units, comprises solving an equivalent eigenvalue problem defined through an equation:

$$\left(I + \sum_i \frac{\lambda_i}{\delta^2} R_i\right)^{-1} R_k t_k = \frac{\delta^2}{\lambda_k}\left(\frac{\gamma+1}{\gamma}\right) t_k,$$

wherein i and k are indices indicating the ith and kth terminal device of the plurality of terminal device, $t_k$ is a pre-coding vector for the kth terminal device of the plurality of terminal device defining a first set of beamforming weights, $\gamma$ is the minimum allowable expected value of SINR, $\delta^2$ is a noise term, $R_k$ is a channel covariance matrix $E(H_k^H H_k)$ with $H_k$ being a complex non-deterministic channel matrix for the kth terminal device, E denoting an expected value and H denoting a conjugate transpose operation, I is an identity matrix, $\lambda_i$ is a Lagrangian multiplier for the ith terminal device relating to total transmit power P through $\Sigma_i \lambda_i = \Sigma_i \|t_i\|^2 = P$ at optimal solution, the solving of said equivalent problem comprising:

calculating, for each k indicating the kth terminal device of the plurality of terminal devices, a matrix defined as $$\left(I + \sum_i \frac{\lambda_i}{\delta^2} R_i\right)^{-1} R_k;$$

finding, for each k indicating the kth terminal device of the plurality of terminal devices, the largest eigenvalue of $$\left(I + \sum_i \frac{\lambda_i}{\delta^2} R_i\right)^{-1} R_k,$$

wherein the largest eigenvalue for each index k corresponds to a minimum of the total transmit power while fulfilling the pre-defined constraint; and finding, for each largest eigenvalue, a corresponding eigenvector, wherein each eigenvector corresponds to a first set of optimal beamforming weights for a terminal device of the plurality of terminal devices.

11. The apparatus according to claim 10, wherein the solving of the equivalent eigenvalue problem comprises, for at least one combination of a terminal device of the plurality of terminal devices and a radio unit of the two or more radio units:

finding n largest eigenvalues of $$\left(I + \sum_i \frac{\lambda_i}{\delta^2} R_i\right)^{-1} R_k$$

separately for each k indicating the kth terminal device of said at least one terminal device, wherein n is an integer larger than one; and finding, for each of the n largest eigenvalues, a corresponding eigenvector, wherein each eigenvector corresponds to a first set of optimal beamforming weights for a MIMO layer of a terminal device of said at least one terminal device; and performing rank selection for said at least one terminal device based on results of the optimization.

12. The apparatus according to claim 10, wherein the Lagrangian multiplier $\lambda_k$, for all k, has a pre-defined value.

13. The apparatus according to claim 1, wherein the apparatus is a distributed unit of the distributed access node and the causing of the transmitting of the data using said beams comprises:

transmitting first and second sets of optimized beamforming weights to the two or more radio units of the distributed access node for performing beamforming by the two or more radio units.

14. A method, comprising:

maintaining, in a database, channel state information of a plurality of radio channels, wherein each of the plurality of radio channels is between one of two or more radio units of a distributed access node and one of a plurality of terminal devices and the channel state information comprises first and second order statistics of the plurality of radio channels;

calculating, separately for each of the two or more radio units using an eigenbeamforming scheme, first sets of beamforming weights for forming beams for transmitting from a corresponding radio unit to each of a plurality of terminal devices based on the second order statistics associated with the corresponding remote radio unit;

performing, for each terminal device of the plurality of terminal devices, single-user MIMO optimization between the two or more radio units at least to maximize a pre-defined metric based on all first sets of beamforming weights associated with transmission from the two or more radio units to a corresponding terminal device and on the first order statistics of radio channels between each of the two or more remote radio units and the corresponding terminal device, wherein the pre-defined metric is a mutual information metric or signal-to-interference-plus-noise, SINR, and a result of the single-user MIMO optimization, for each terminal device, is a second set of beamforming weights to be applied for transmission to said terminal device; and causing transmitting data, from the two or more radio units to the plurality of terminal devices, using beams formed by applying both first and second sets of optimized beamforming weights at the two or more radio units.

15. A computer program embodied on a non-transitory computer-readable medium, said computer program comprising program instructions which, when executed on hardware, cause the hardware to perform at least:

maintaining, in a database, channel state information of a plurality of radio channels, wherein each of the plurality of radio channels is between one of two or more radio units of a distributed access node and one of a plurality of terminal devices and the channel state information comprises first and second order statistics of the plurality of radio channels;

calculating, separately for each of the two or more radio units using an eigenbeamforming scheme, first sets of beamforming weights for forming beams for transmitting from a corresponding remote radio unit to each of a plurality of terminal devices based on the second order statistics associated with the corresponding radio unit;

performing, for each terminal device of the plurality of terminal devices, single-user MIMO optimization between the two or more radio units at least to maximize a pre-defined metric based on all first sets of beamforming weights associated with transmission from the two or more radio units to a corresponding terminal device and on the first order statistics of radio channels between each of the two or more radio units and the corresponding terminal device, wherein the pre-defined metric is a mutual information metric or signal-to-interference-plus-noise, SINR, and a result of the single-user MIMO optimization, for each terminal device, is a second set of beamforming weights to be applied for transmission to said terminal device; and causing transmitting data, from the two or more radio units to the plurality of terminal devices, using beams formed by applying both first and second sets of optimized beamforming weights at the two or more radio units.

* * * * *